US009993856B2

(12) United States Patent
Asolekar

(10) Patent No.: US 9,993,856 B2
(45) Date of Patent: Jun. 12, 2018

(54) METHOD AND SYSTEM FOR THE REMEDIATION OF CONTAMINATED EARTH FROM HAZARDOUS SUBSTANCES IN A BATCH-WISE EX-SITU ON-SITE MANNER

(75) Inventor: Shyam Ramchandra Asolekar, Maharashtra (IN)

(73) Assignee: Indian Institute of Technology Bombay, Maharashtra (IN)

( * ) Notice: Subject to any disclaimer, the term of this patent is extended or adjusted under 35 U.S.C. 154(b) by 0 days. days.

(21) Appl. No.: 13/820,976

(22) PCT Filed: Sep. 6, 2011

(86) PCT No.: PCT/IN2011/000609
§ 371 (c)(1),
(2), (4) Date: Mar. 5, 2013

(87) PCT Pub. No.: WO2012/032542
PCT Pub. Date: Mar. 15, 2012

(65) Prior Publication Data
US 2013/0183099 A1 Jul. 18, 2013

(30) Foreign Application Priority Data
Sep. 6, 2010 (IN) .......................... 2475/MUM/2010

(51) Int. Cl.
*B09C 1/08* (2006.01)
*B09C 1/00* (2006.01)
*B09C 1/02* (2006.01)

(52) U.S. Cl.
CPC .................. *B09C 1/08* (2013.01); *B09C 1/00* (2013.01); *B09C 1/02* (2013.01)

(58) Field of Classification Search
USPC .................. 405/128.1, 128.7, 128.75, 128.8; 210/170.01, 170.07, 741.1, 741.7, 739, (Continued)

(56) References Cited

U.S. PATENT DOCUMENTS 5,344,255 A * 9/1994 Toor .......................... 405/128.75
5,794,862 A * 8/1998 Toor ............................... 241/21
(Continued)

OTHER PUBLICATIONS http://dictionary.reference.com/browse/tumbling; date unknown.*
(Continued)

*Primary Examiner* — Sean D Andrish
(74) *Attorney, Agent, or Firm* — Knobbe, Martens, Olson & Bear, LLP

(57) ABSTRACT

Method and system for the remediation of contaminated earth from hazardous substances in a batch-wise ex-situ on site manner. At least one mobile earth moving equipment, at least one mobile tumbler reactor and at least one liquid-solid separator are organized at a location in the proximity of the contaminated site. Contaminated earth portions are collected from the contaminated site batch by batch in the mobile earth moving equipment and transferred to the mobile tumbler reactor at the location. The contaminated earth portions in the mobile tumbler reactor are dosed with cleaning agents and water washed in the reactor under agitation or tumbling. The mixture of water washed earth portions and wash water with cleaning agents transferred into the liquid-solid separator and the wash water with the cleaning agents is separated from the mixture in the separator. The cleaned earth portions in the separator are transferred into the earth moving equipment, transported back to the contaminated site and deposited at the contaminated site until the entire contaminated earth at the contaminated site is remedied.

16 Claims, 4 Drawing Sheets

(58) Field of Classification Search
USPC .......................................................... 210/143
See application file for complete search history.

(56) References Cited

U.S. PATENT DOCUMENTS

| | | |
|---|---|---|
| 7,731,840 B1 | 6/2010 | Mallonee et al. |
| 2011/0170953 A1* | 7/2011 | Diamond ................. 405/128.75 |

OTHER PUBLICATIONS

International Search Report issued in application No. PCT/IN2011/000609 dated Jul. 10, 2012.
Examination Report issued in European application No. 11805621.7 dated May 2, 2017.
Translation of cited pages of Handbuch_bodenwaesche, 5 pages.

* cited by examiner

METHOD AND SYSTEM FOR THE REMEDIATION OF CONTAMINATED EARTH FROM HAZARDOUS SUBSTANCES IN A BATCH-WISE EX-SITU ON-SITE MANNER

FIELD OF THE INVENTION

This invention relates to a method and system for the remediation of contaminated earth from hazardous substances in a batch-wise ex-situ on-site manner.

The term ex-situ on site as used in this specification is intended to mean not directly at the contaminated site but in the proximity of the site.

The term contaminated site as used in this specification includes contaminated beaches, industrial or commercial sites or historical or archeologically important sites, wetland, ecologically or environmentally congested places or the like loaded with toxic or hazardous pollutants (substances or materials or wastes) like petroleum products including free oils, petroleum oil fractions, petroleum fuels, petroleum feed stock based chemicals, fractionated pure solvents and mixtures and other organic and inorganic pollutants like persistent and trace toxic pollutants, pesticides, herbicides, insecticides and/or their intermediates and toxic raw materials, heavy metals, organo-metallic complexes, paints, pigments, dyes, fine chemicals, residues from organic and inorganic chemical processing agents causing damage to health, environment, ecology or property as well as weathered and naturally altered products and by-products of the above pollutants.

The term contaminated earth, as used in this specification, includes contaminated matrix of soil, sand, silt, sediments, aquifer solids, slush, pebbles, stones, shells, aggregates, weeds or combinations thereof.

BACKGROUND OF THE INVENTION

Environment is getting more and more polluted and contaminated day by day with the release of hazardous substances including toxic substances or materials and wastes into the environment. Environmental pollution is causing not only irreparable damage to the flora or fauna and the marine life but also forcing climatic changes. It is becoming a matter of grave concern to the entire world. There are various reasons for the environmental pollution like effluents and wastes being generated due to industrialisation and urbanization and accidental spillage and/or careless release or dumping of oil and other petroleum products, industrial effluents or wastes, sludges, residential wastes or the like into the environment or water bodies. Beaches are getting polluted with spills of petroleum products like crude oils, fuels or solvents or wastes from ships or ship repairing or dismantling activities or recycling activities in ocean, in ports, harbours or docks or from ship-wrecks or from busting or leakage of oil pipelines.

Contamination of soils, sediments and sands with hazardous or toxic chemicals and wastes is becoming an event of frequent occurrence and the magnitude of its adverse impact is ever increasing. Pollution is becoming a major problem in oceans, on coasts and beaches, in wetlands and surface water bodies, underground aquifers and industrial and commercial sites and needs effective solution for the survival and well being of the habitat.

Accidental spills of oily petroleum products into the sea continue to occur in various parts of the world from time to time creating havoc. For example, the Exxon Valdez incident in Prince Williams Sound, Ak., in March, 1989, the oil spill from oil wells in Kuwait that caused fire during Iraq-Kuwait-USA war during late 1989 and the BP (British Petroleum) oil spill that occurred recently. BP oil spill reportedly poured over one million tonnes of crude oil into the Gulf of Mexico in April, 2010. Recently, off the Mumbai coast, oil spilled from the ship "MSC Chitra" after collision with the ship "m v Khalijia-III" on Saturday morning, 7 Aug. 2010. An alarming level of oil got spilled into the ocean (nearly 1,000 tonnes) and subsequently was found in the sands on the beaches in Mumbai, India and at Sasvane, Alibag and Uran (all towns in the coastal District of Raigad near Mumbai), creating a disaster for fishermen and fish habitats. Within four days, oil also reached the shores of the Gharapuri Island, near Mumbai, which hosts the archeologically important Elephanta Caves. Several acres of mangrove forests including newly germinated and growing saplings of mangroves were covered with free floating oil and weathered products of spilled oil.

Remediation or decontamination of sites contaminated with pollutants has been an active area of research in the field of environmental science and engineering, especially during the past three decades. Because of the ever increasing threat of pollution, the research in this area is becoming more intensified and there is an urgent need to develop technological solutions to a variety of contamination situations resulting from causative factors as stated earlier. There are two ways in which site remediation is addressed, namely in-situ on site and ex-situ on site solutions based on physico-chemical treatments. Another way of dealing with the problem is biological treatment.

In the case of in-situ on site clean-up operations undertaken by the Exxon Corporation in 1989 in Prince Williams Sound, Ak., USA, hot water jets mixed with oil dispersing chemicals were sprayed under pressure at the site of contamination. However, the above procedure could merely transfer free oil coating on surfaces like those of boulders, aggregates, pebbles, jetties or piers. As a result, dislodged oil and weathered oily residues got deposited onto superficial layers of sandy beaches, mud flats and coastal sediments and eventually percolated into deeper layers of sediments creating additional secondary pollution. Therefore, efforts were also made to skim-off floating oil from the water surface. The procedure has been only partially successful in the clean up operations thereby leaving most of the oil pollution unattended in the marine environment. Clearly, there has not been any effective sand or sediment or silt cleaning technology or method available for decontamination of pollutant-loaded earth solids. Use of jets of hot water and chemical solutions to wash and clean surfaces as stated earlier, only aggravated the problem of contamination of sands, sediments and silts on the coasts.

In the events of oil spills, bacteria present in the coastal silt, sediments and sands do get eventually acclimated to the polluted environment and develop ability to denature the pollutants in due course of time as is evident from studies conducted on several species of bacteria and their strains isolated from the polluted coastal sites. Because of this adaptation of the bacteria, in fact, the native flora and fauna got affected on the polluted marine coast and the entire ecosystem got altered.

Bioremediation of contaminated sites was carried out using specific cell cultures containing active beneficial species isolated and selected from the polluted sites and cultivated in the laboratory. Bioremedy was also tried by spraying genetically modified microorganisms and enzyme-mediated formulations prepared in the laboratory or cultured and formulated using biotechnological methods. The degradation rates for targeted pollutants in open natural systems with the help of microbes cultivated in laboratory environment is known to be slow and compromised due to the interference of other microbial flora at the contaminated site. The microbes also may not reach the intricate places where the pollutants have gotten diffused to and microbial population may not get sustained in the open environment. As a result, a critical concentration of the desirable microorganism or desirable mixed culture of a consortium of microorganisms remains so low that it does not produce desirable results and it fails to create ecological niche for itself.

The micro-organisms selected from naturally occurring contaminated sites and cultivated for real-life bio-remediation operations or designer microbes (genetically modified to denature a given pollutant) if applied in real-life situations in the so-called open systems may face difficulty in performing in the presence of high concentrations of oils and weathered oil-products at a given contaminated site. The high concentrations of pollutants may prove to be toxic to them and may prove to be detrimental to their community.

The various in-situ on-site treatments as stated above employ dedicated treatment plants installed in-situ onsite and have shown limited success in real situations and have several limitations. Because of the non-homogeneity of soil, sediment or sand, the ability to engineer the contaminated site and to achieve uniform cleaning of contaminated areas is reduced. As a result the in-situ techniques are not very efficient and effective. Cost and erection time for the plants is very huge. Invariably multiple installations of in-situ onsite treatment plants are required as contaminated beaches extend to tens or hundreds of kilometers. Because of this, the cost of in-situ techniques ends up typically becoming prohibitive and, therefore, in realistic situations they may not be economically viable.

Earlier research has described the effectiveness of desorption for removing contaminants from sand or soil [Rao, B H, Swaminathan, R., and Asolekar, S. R. (2001). Washing of Marine Coastal Sand in a Batch Reactor: Sorption and Desorption of BTEX. J Air & Waste Manage Assoc., vol. 51, pp. 1043-1059; and Rao, B H and Asolekar, S. R. (2001). QSAR Models to Predict Effect of Ionic Strength on Sorption of Chlorinated Benzenes and Phenols at Sediment-Water Interface. Water Research, vol. 35, pp. 3391-3401].

In reality, however, such techniques envisage transportation of polluted materials from the contaminated sites to the reactors erected at a location for decontamination and transportation of cleaned sand or soil back to the contamination sites. Such techniques require dedicated treatment plants at the location and huge sand and sediment washing reactors and solids—wastewater separation devices permanently erected and installed at the location. As a result, the cost is increased substantially. The reactors require massive foundations. Provision of effective foundation for the reactors would be a difficult task in sandy beaches or industrially or commercially contaminated sites.

Transportation of huge quantities of excavated soil from the site of excavation to the reactors and back to the excavation site is very expensive and cumbersome. Further, installation of the treatment plant at one location alone would not be sufficient to provide remediation service to a large area as contaminated beaches extend to a long distance.

Alternative is to have multiple treatment plants which will increase the cost correspondingly. A stationary facility for remediation is also not very effective and useful since accidents of spillage of oil may happen anywhere. Also, development of dedicated reactors and washing plants involves capital investment which can be amortized only if the reactors and plants are utilized to the optimum. Erection time for such plants is also very long.

It is evident from the above state of the technology of environmental remediation that there are no effective methods and equipments available for addressing and managing disasters like marine oil spills causing contamination of sandy beaches and coastal ecosystems or land-based disasters created by large scale spills of toxic and hazardous chemicals or disasters caused by the negligent disposal of toxic and hazardous wastes into water bodies and dumpsites. There is thus need for effective, economical and easy to implement method and system to remedy or decontaminate polluted environment from hazardous substances.

SUMMARY OF THE INVENTION

According to the invention there is provided a method for the remediation of contaminated earth from hazardous substances in a batch-wise ex-situ on site manner comprising the steps of operations of organizing at least one mobile earth moving equipment, at least one mobile tumbler reactor and at least one liquid-solid separator at a location in the proximity of the contaminated site, collecting batch by batch contaminated earth portions from the contaminated site in the mobile earth moving equipment, transporting the contaminated earth portions to the location and transferring the contaminated earth portions to the mobile tumbler reactor, dosing the contaminated earth portions in the mobile tumbler reactor with cleaning agents and water washing the contaminated earth portions in the reactor under agitation or tumbling, transferring the mixture of water washed earth portions and wash water with cleaning agents in the mobile tumbler reactor into the liquid-solid separator and separating the wash water with the cleaning agents from the mixture in the separator, transferring the cleaned earth portions in the separator into the earth moving equipment, transporting the cleaned earth portions back to the contaminated site and depositing the cleaned earth portions at the contaminated site until the entire contaminated earth at the contaminated site is remedied and controlling the logistics of carrying out the steps of operations.

According to an embodiment of the invention, the method further comprises the step of operation of organizing at least one water treatment plant at the location and subjecting the wash water from the mixture in the liquid-solid separator to effluent treatment techniques to separate clean water from the hazardous substances in the wash water. Alternately, the wash water may be hauled to wastewater treatment facility and treated.

According to the invention there is also provided a system for remediation of contaminated earth from hazardous substances in a batch-wise ex-situ on-site manner comprising at least one mobile earth moving equipment, at least one mobile tumbler reactor and at least one liquid-solid separator organised at a location in the proximity of the contaminated site and a controller for controlling the logistics of operations of the mobile earth moving equipment, mobile tumbler reactor and liquid-solid separator, the mobile earth moving equipment being deployed for collecting batch by batch contaminated earth portions from the contaminated site, transporting the contaminated earth portions to the location, transferring the contaminated earth portions to the mobile tumbler reactor, receiving the cleaned earth portions from the liquid-solid separator and transporting the cleaned earth portions back to the contaminated site and depositing the contaminated earth portions at the contaminated site until the entire contaminated earth is remedied completely, the mobile tumbler reactor being deployed for having the contaminated earth portions dosed with cleaning agents and water washed under agitation or tumbling and for transferring the mixture of water washed earth portions and wash water with cleaning agents into the liquid-solid separator and the liquid-solid separator being deployed for separating the wash water with cleaning agents from the cleaned earth portions and transferring the cleaned earth portions into the mobile earth moving equipment.

According to the invention there is also provided a system for remediation of contaminated earth from hazardous substances in a batch-wise ex-situ on-site manner comprising at least one mobile earth moving equipment, at least one mobile tumbler reactor, at least one liquid-solid separator and at least one wash water treatment plant organised at a location in the proximity of the contaminated site and a controller for controlling the logistics of operations of the mobile earth moving equipment, mobile tumbler reactor, liquid-solid separator and wash water treatment plant, the mobile earth moving equipment being deployed for collecting batch by batch contaminated earth portions from the contaminated site, transporting the contaminated earth portions to the location, transferring the contaminated earth portions to the mobile tumbler reactor, receiving the cleaned earth portions from the liquid-solid separator and transporting the cleaned earth portions back to the contaminated site and depositing the contaminated earth portions at the contaminated site until the entire contaminated earth is remedied completely, the mobile tumbler reactor being deployed for having the contaminated earth portions dosed with cleaning agents and water washed under agitation or tumbling and for transferring the mixture of water washed earth portions and wash water with cleaning agents into the liquid-solid separator and the liquid-solid separator being deployed for separating the wash water with cleaning agents from the cleaned earth portions and transferring the cleaned earth portions into the mobile earth moving equipment and the wash water with cleaning agents to the wash water treatment plant.

According to an embodiment of the invention, the controller comprises a logic circuit or processor configured and programmed to automatically control the logistics of operation of the earth moving equipment, mobile tumbler reactor and liquid-solid separator and wash water treatment plant, if any.

According to another embodiment of the invention, the controller is manually controlled or partly manually controlled and partly automatically controlled.

According to an embodiment of the invention, the wash water treatment plant is connected to the mobile tumbler reactor for recycling the clean water as wash water into the reactor.

DETAILED DESCRIPTION OF THE INVENTION

Figure 1:
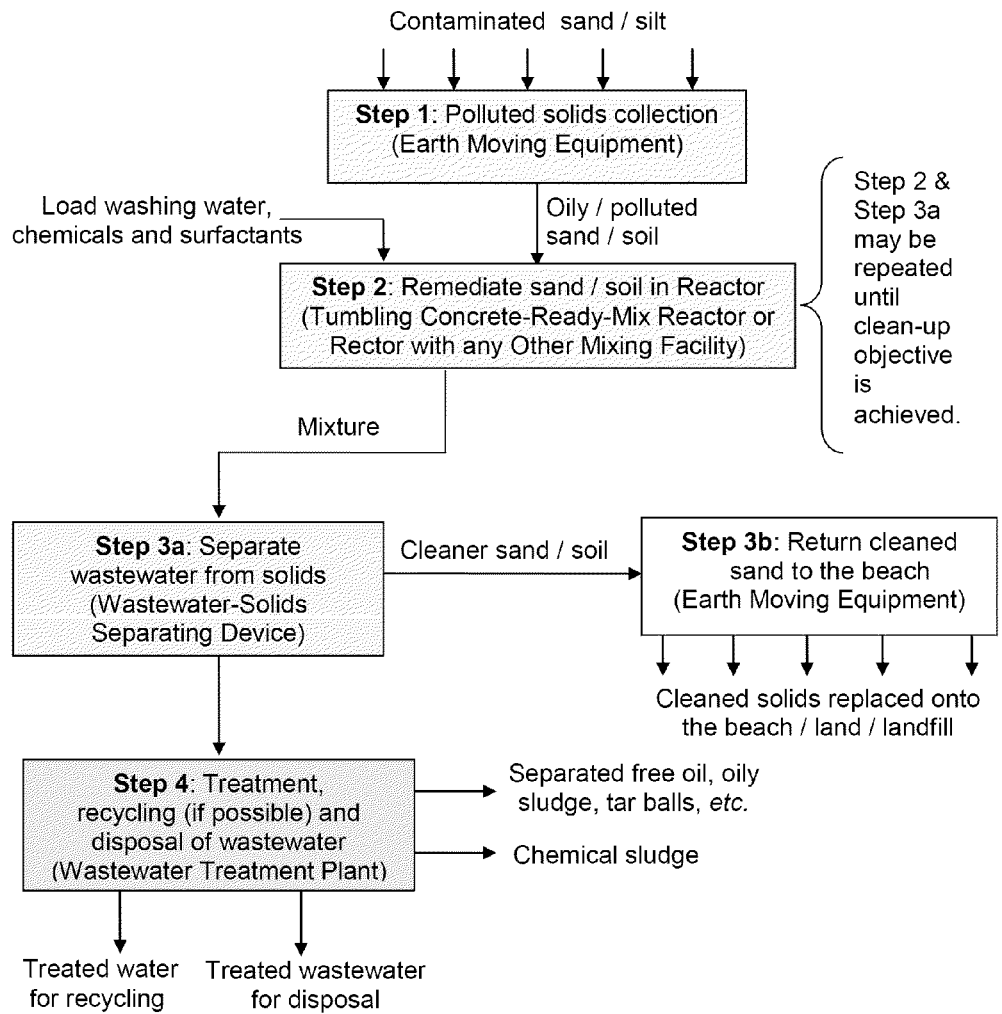
FIG. 1 provides a process flow-chart of the four steps envisaged in ex-situ on-site cleaning operation.

In order to improve the efficiency of the method and to reduce time for remediation, depending upon the extent and nature of contamination, the method and system may include a plurality of earth moving equipments, tumbler reactors, liquid-solid separators and/or wash water treatment plants. During operation of the system, the mobile earth moving equipments collect contaminated earth portions in batches from the contaminated site and transport them to the location. The contaminated earth portions are then transferred into the mobile tumbler reactors and are dosed with cleaning agents and washed with water under agitation or tumbling.

The mixture of solids and wash water with cleaning agents is taken in the liquid-solid separators and the cleaned solids are separated from wash water with cleaning agents in the separators. The cleaned solids are loaded into the earth moving equipments and transported back to the contaminated site and deposited at the site at appropriate places until the entire contaminated site is remedied from the hazardous substances.

It may not be desirable or permissible to let the wash water into the environment without being treated. Therefore, it is preferable that the wash water is subjected to effluent treatment techniques to separate clean water from the hazardous substances. Accordingly, the method of the invention includes the step of subjecting the wash water from the separators to water treatment techniques to separate clean water from the hazardous substances and the system of the invention includes or more wash water treatment plants for such purpose. The wash water treatment plant(s) may be installed at the location and may form a part of the system. The wash water treatment plant(s) may be connected to the mobile tumbler reactors for recycling the clean water into the reactors as wash water.

Alternatively, the wash water may be hauled or transported to effluent or wastewater treatment plants located elsewhere. It is also possible to treat the wash water fully or partially and recycle it for washing the contaminated earth portions or reuse elsewhere or dispose of according to known water disposal procedures.

The wash water is subjected to treatments which are known effluent treatment procedures and the water treatment plant(s) used are known effluent treatment plant(s). The treatment techniques and treatment plants are selected depending upon the nature and chemical constitution of the contaminants in the wash water. The residual matter obtained from the wash water treatment is further treated using treatment procedures known in the art for treatment of such residual matter. The resulting residues are disposed of in accordance with known practices.

Modes of operation and operational parameters like batch time, number of washings with water and the number of dosing of cleaning agents will depend on the extent and nature of contamination and will have to be selected. The number of dosing of cleaning agents and water washings may be one or several. The dosing of cleaning agents and water washing may be carried out simultaneously or sequentially. Alternatively, dosing of cleaning agents and water washing may be carried out in a cocurrent manner or in a counter current manner in order to improve the washing efficiency. The water used for washing may be ambient temperature water or warm/hot water depending upon the environmental conditions at the site.

The cleaning agents to be used and the clean up or decontamination strategy to be employed will depend up on the nature of the contaminants or pollutants and the extent and concentration of the contaminants or pollutants. The clean up procedures for the contaminated earth portions in the reactors are based on known wastewater treatment procedures and may include physio-chemical treatments.

The cleaning agents that may be used in the method of the invention may comprise of commercially available detergents and/or soaps and may include chemicals like alkyl benzene sulfonate, sodium dodecyl sulfate (SDC), sodium lauryl sulfate, ethoxylate (EO), ethoxylated alkyl phenols, anionic sulfonated alkyl esters, sodium tetradecyl sulfate (4-undeconal,7-ethyl-2-methyl-,sulfate, sodium salt), diethylene glycol ethyl ether (ethanol, 2-(2-ethoxyethoxy)-), mixture of ethoxylated fatty acids, natural surfactants like *Sapindus mukorossi* obtained from fruit along with chemicals like sodium hydroxide (NaOH) which acts as a chelating agent or hydroxyl-2-cyclodextrin (HPCD) used to reduce the sorption and enhance the transport of several low polarity organic compounds. Aqueous acidic solutions also be used along with water during soil washing. The examples are for illustration purposes and actual use may be decided from case to case upon conducting treatability trials for achieving a prescribed target of clean-up. The recipe of clean-up solutions (proportions of surfactants and other chemicals) and other operating parameters of reactor such as cycles of clean-up routines, solids-to-water ratios, batch cleaning time or temperature will vary from case to case.

The mobile earth moving equipments used in the invention are those available for earth moving and handling operations and having space for loading contaminated earth portions and include earth moving excavators.

The mobile tumbler reactors are those generally used for mixing liquids with solids like truck mixers equipped with tumblers used for mixing and delivering cement-concrete to the construction site, revolving drum truck mixers or mobile or portable devices having vibrating, rotating, stirring, gyrating, aerating, gas/air sparging, shaking or sonicating type mixing arrangements. However, the dosing of the contaminated earth portions with cleaning agents and washing with water need not be under agitation or tumbling if so desired. Therefore, such dosing and washing are also within the scope of the invention.

The liquid-solid separators used in the invention are those available for liquid-solid separation and may be mobile or mounted on wheels or mounted on make-shift temporary foundations. The mobile or portable liquid-solid separators are, for example, centrifuges, settling devices having slanted plates or slanted bundle of tubes or slanted honey-comb-like settling arrangements. The liquid-solid separators may be settlers or thickeners or devices of cylindrical, rectangular, section of cone or any other geometrical shape to facilitate settling.

The above equipments are used as such or with minor changes by way of adaptation for use in the invention like choice of material of construction, protective paints and liners to improve their durability. Adaptations also may be required for tracking/monitoring/qualifying/quantifying the extent of decontamination/clean-up of solids and/or liquids encountered in the process of remediation.

Figure 2:
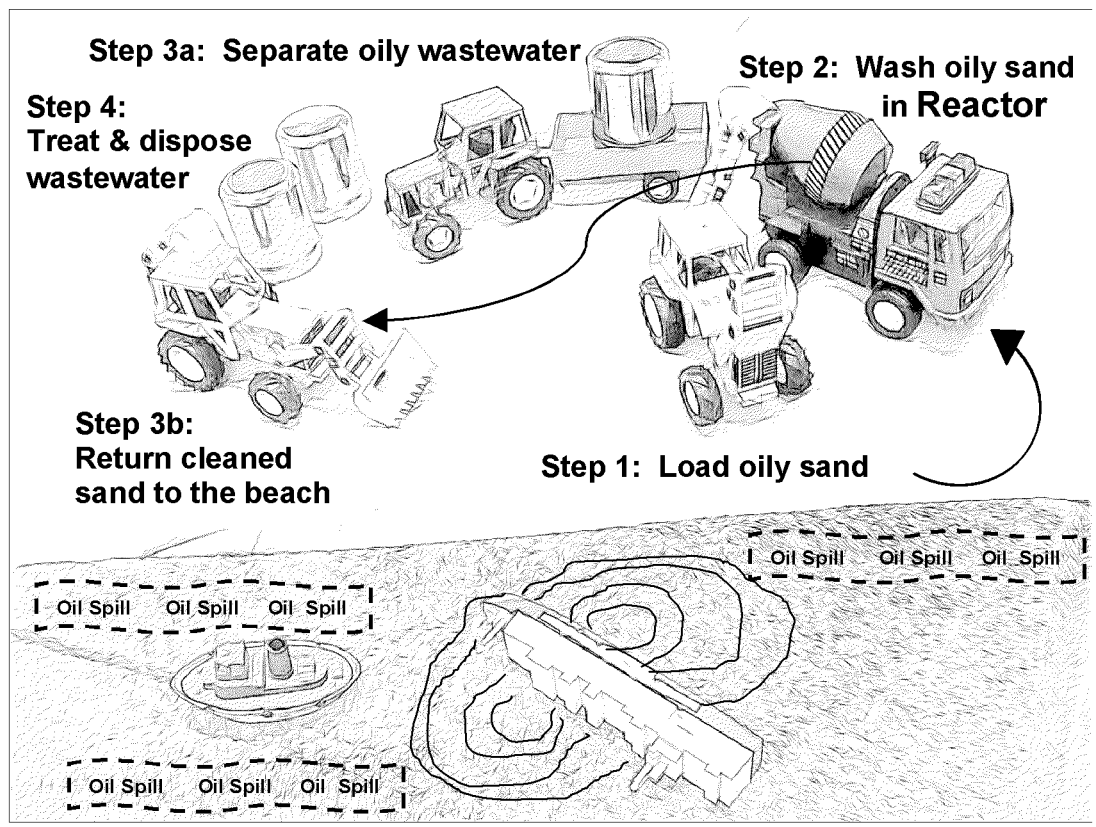
FIG. 2 provides a schematic depiction of the four steps envisaged in ex-situ on-site cleaning operation.
Figure 3:
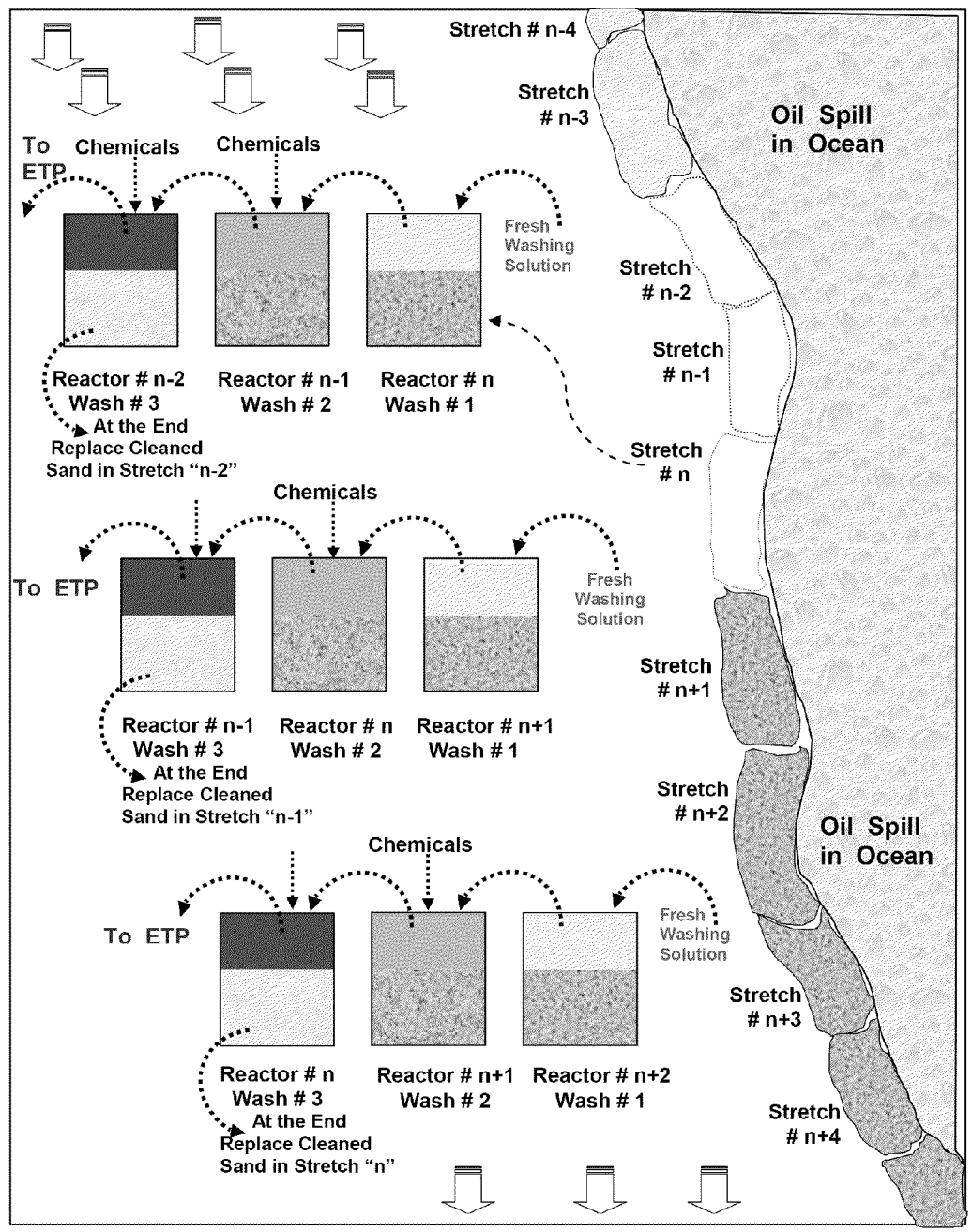
FIG. 3 provides a process flow diagram for a proposed countercurrent washing scheme for ex-situ on-site cleaning operation.
Figure 4:
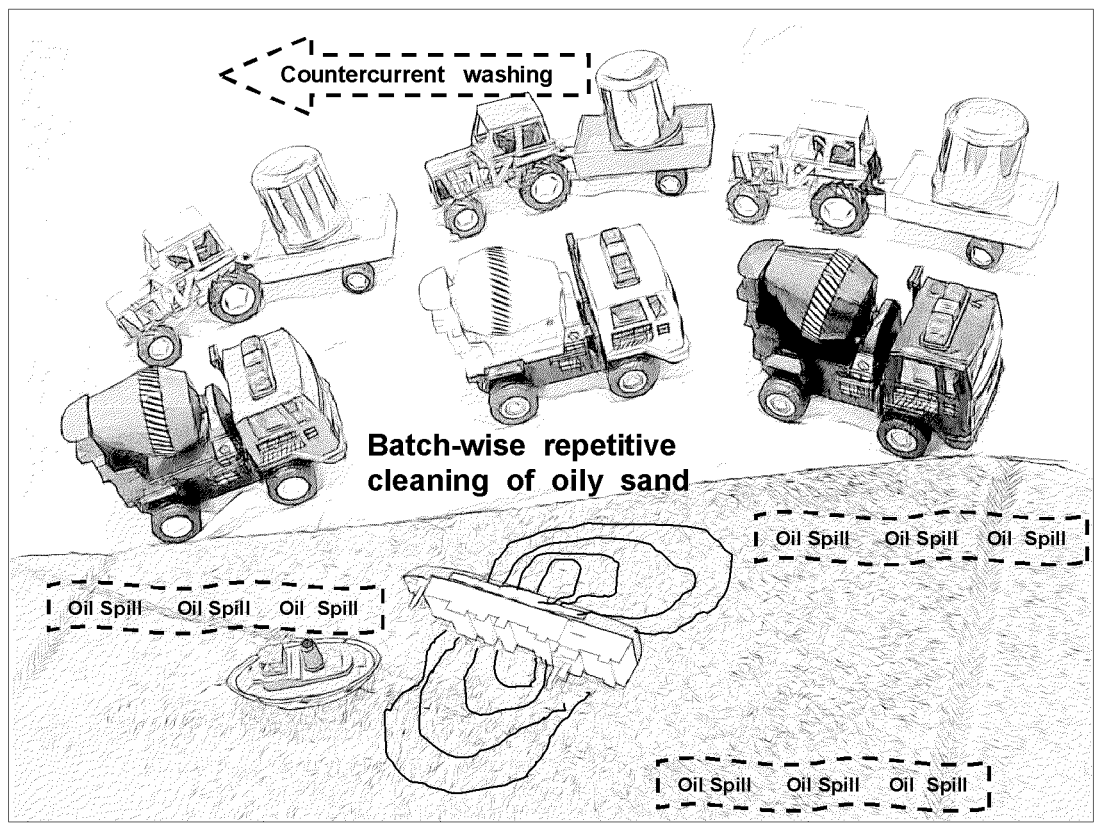
FIG. 4 provides a schematic of countercurrent washing proposed for ex-situ on-site cleaning operation.

A process flow-chart of the four steps envisaged in ex-situ on-site cleaning operation are provided in FIG. 1. A schematic depiction of the four steps envisaged in ex-situ on-site cleaning operation is provided in FIG. 2. A process flow diagram for a proposed countercurrent washing scheme for ex-situ on-site cleaning operation is provided in FIG. 3. A schematic of countercurrent washing proposed for ex-situ on-site cleaning operation is provided in FIG. 4.

According to the invention, the mobile earth moving equipments, mobile tumbler reactors and liquid-solid separators and wash water treatment plant(s), if any are configured and logistically operated to clean-up the environmental contamination in a batch-wise ex-situ onsite manner. The system configuration of the invention is not a dedicated one but a temporarily organised one. Deployment of such equipments at one location or at multiple locations and operations of the equipments in a logistic manner is very convenient and easy to carry out. Because of the equipments being easily available and being low cost, they can be easily organised or mobilised at a single location or multiple locations so as to carry out the cleaning operation very fast and in a very cost effective and efficient manner.

The equipments also can be easily dispersed or disposed off after the clean-up operation. It becomes possible only because the various equipments proposed to be used are normally meant for their respective known purposes and are to be organized only when the need arises.

However, they are, rugged and robust in construction to work in sandy, muddy, silty, slippery, abrasive, wet, rough and bumpy surfaces and surroundings and are easily available and can be easily mobilised and logistically controlled within a short time.

According to the invention, proximity of the location of clean up to the contamination site also renders the cleaning operation further easy and convenient. Time for the cleaning operation is further reduced. Cleaning operation is also efficient, effective and economical. The invention eliminates huge dedicated plants and massive foundations otherwise required; thereby reducing costs substantially and eliminating erection time. Because of the batch-wise operation, the volumes to be handled at a time are small and the method can be easily and conveniently carried out repeatedly till the desirable clean-up is achieved and it is simple.

At a given location on a contaminated site, in order to optimize the use of water and cleaning agents, contaminated solids are loaded in one reactor or multiple reactors and subjected to multiple washing cycles such that wash water from one washing cycle is systematically transferred sequentially to subsequent washing cycle. Because the equipments are mobile and easily available and because the equipments can be easily organised, the configuration of equipments can be moved from one location of contaminated site to another location to achieve clean-up at different locations of the contaminated site, especially when the contaminated site is very large. The movement of the equipments configuration on the contaminated site ensures clean-up in a fast and effective manner.

The various equipments are orchestrated in such a manner that the wash waters and cleaning agents used in the washing cycles are loaded in the reactors and separators in a systematic and sequential manner so as to achieve ex-situ on-site cleaning operation in an optimal manner while minimizing use of water and cleaning agents during the cleaning operation. The invention is especially suitable in an emergency or accident like an oil spillage.

Modifications of the invention apparent or obvious to persons skilled in the art upon reading this specification are to be construed and understood to be within the scope of the invention. For instance, it may be possible to carry out the method of the invention in a continuous or semicontinuous mode. Instead of water, organic solvents may be used for washing. Water is preferred for washing for considerations of cost and easy availability in plenty. Such variations of the invention are to be construed and understood to be within the scope of the invention.

The invention claimed is:

1. A method for the remediation of contaminated earth from hazardous substances comprising dosing portions of the contaminated earth in a mobile tumbler reactor with cleaning agents and water washing portions of the contaminated earth in the reactor under agitation or tumbling; the method comprising a system configuration, that is temporarily organized, not dedicated only for the remediation of contaminated earth, and further comprising steps of
organizing equipment that are mobile and easily available, effectively eliminating need of a plant dedicated only for the remediation of contaminated earth; the said equipment comprising:
(a) at least one mobile earth moving equipment
(b) at least one mobile tumbler reactor and
(c) at least one liquid-solid separator
at a location in the proximity of a contaminated site and configuring and logistically operating the equipment comprising the at least one mobile earth moving equipment, the at least one mobile tumbler reactor and the at least one liquid-solid separator to clean-up environmental contamination in a batch-wise ex-situ on site manner.

2. The method of claim 1 for the remediation of contaminated earth from hazardous substances comprising the steps of
(a) collecting batch by batch the contaminated earth portions from the contaminated site in the at least one mobile earth moving equipment,
(b) transporting the portions of the contaminated earth to the location and transferring the portions of the contaminated earth to the at least one mobile tumbler reactor,
(c) dosing the portions of contaminated earth in the at least one mobile tumbler reactor with cleaning agents and water washing the portions of contaminated earth in the at least one mobile tumbler reactor under agitation or tumbling,
(d) transferring mixture of water washed earth portions and wash water with cleaning agents in the at least one mobile tumbler reactor into the at least one mobile liquid-solid separator and separating the wash water with the cleaning agents from the mixture in the at least one mobile liquid-solid separator,
(e) transferring cleaned earth portions in the at least one mobile liquid-solid separator into the at least one mobile earth moving equipment,
(f) transporting the cleaned earth portions back to the contaminated site and depositing the cleaned earth portions at the contaminated site until the entire contaminated earth at the contaminated site is remedied.

3. The method as claimed in claim 2, wherein the logistics of carrying out the steps of operations are controlled (a) automatically, (b) manually or (c) partly manually and partly automatically.

4. The method as claimed in claim 2, which further comprises of organizing at least one water treatment plant at the location and subjecting the wash water from the mixture in the at least one mobile liquid-solid separator to effluent treatment techniques to separate clean water from the hazardous substances in the wash water.

5. The method as claimed in claim 4, wherein the separated clean water is recycled to the at least one mobile tumbler reactor as wash water.

6. The method as claimed in claim 2, wherein the dosing of the contaminated earth portions with the cleaning agents and the water washing of the contaminated earth portions are carried out simultaneously, sequentially, in a concurrent or counter current manner.

7. A system for remediation of contaminated earth from hazardous substances comprising
mobile equipment comprising:
(a) at least one mobile earth moving equipment
(b) at least one mobile tumbler reactor and
(c) at least one liquid-solid separator and
at least one wash water treatment plant connected to the at least one mobile tumbler reactor for recycling clean water as wash water into at least one mobile tumbler reactor wherein
the system is temporarily organized at a location in the proximity of a contaminated site; and effectively eliminates the need for a plant dedicated only for the remediation of contaminated earth, and
the system is used to remediate said contaminated earth from hazardous substances in a batch-wise ex-situ on site manner comprising dosing contaminated earth portions in the at least one mobile tumbler reactor with cleaning agents and water washing portions of the contaminated earth in the at least one mobile tumbler reactor under agitation or tumbling.

8. The system of claim 7 for remediation of contaminated earth from hazardous substances organized at the location in the proximity of the contaminated site comprising a controller for controlling logistics of operations of the at least one mobile earth moving equipment, at least one mobile tumbler reactor, at least one liquid-solid separator and at least one wash water treatment plant, wherein:
(a) the at least one mobile earth moving equipment being deployed for collecting batch by batch contaminated earth portions from the contaminated site, transporting the contaminated earth portions to the location, transferring the contaminated earth portions to the at least one mobile tumbler reactor, receiving the cleaned earth portions from the at least one liquid-solid separator and transporting the cleaned earth portions back to the contaminated site and depositing the contaminated earth portions at the contaminated site until the entire contaminated earth is remedied completely,
(b) the at least one mobile tumbler reactor being deployed for having the contaminated earth portions dosed with cleaning agents and water washed under agitation or tumbling and for transferring the mixture of water washed earth portions and wash water with cleaning agents into the at least one liquid-solid separator, and
(c) the at least one liquid-solid separator being deployed for separating the wash water with cleaning agents from the cleaned earth portions and transferring the cleaned earth portions into the at least one mobile earth moving equipment and the wash water with cleaning agents to the at least one wash water treatment plant.

9. The system as claimed in claim 7, wherein the controller comprises a logic circuit or processor configured and programmed to automatically control the logistics of operation of the at least one mobile earth moving equipment, at least one mobile tumbler reactor, at least one liquid-solid separator and at least one wash water treatment plant.

10. The system as claimed in claim 8, wherein the controller is manually controlled or partly manually controlled and partly automatically controlled.

11. The system as claimed in claim 7, wherein the at least one liquid-solid separator is mobile or stationary.

12. A system for remediation of contaminated earth from hazardous substances comprising mobile equipment comprising:
(a) at least one mobile earth moving equipment
(b) at least one mobile tumbler reactor and
(c) at least one liquid-solid separator and
at least one wash water treatment plant organized at a location for treating wash water, wherein
the system is temporarily organized at a location in the proximity of a contaminated site; and effectively eliminates the need for a plant dedicated only for the remediation of contaminated earth, and
the system is used to remediate said contaminated earth from hazardous substances in a batch-wise ex-situ on site manner comprising dosing contaminated earth portions in the at least one mobile tumbler reactor with cleaning agents and water washing portions of the contaminated earth in the at least one mobile tumbler reactor under agitation or tumbling.

13. The system of claim 12 for remediation of contaminated earth from hazardous substances organized at the location in the proximity of the contaminated site comprising a controller for controlling logistics of operations of the at least one mobile earth moving equipment, at least one mobile tumbler reactor, at least one liquid-solid separator and at least one wash water treatment plant, wherein:
(a) the at least one mobile earth moving equipment being deployed for collecting batch by batch contaminated earth portions from the contaminated site, transporting the contaminated earth portions to the location, transferring the contaminated earth portions to the at least one mobile tumbler reactor, receiving the cleaned earth portions from the at least one liquid-solid separator and transporting the cleaned earth portions back to the contaminated site and depositing the contaminated earth portions at the contaminated site until the entire contaminated earth is remedied completely,
(b) the at least one mobile tumbler reactor being deployed for having the contaminated earth portions dosed with cleaning agents and water washed under agitation or tumbling and for transferring the mixture of water washed earth portions and wash water with cleaning agents into the at least one liquid-solid separator, and
(c) the at least one liquid-solid separator being deployed for separating the wash water with cleaning agents from the cleaned earth portions and transferring the cleaned earth portions into the at least one mobile earth moving equipment and the wash water with cleaning agents to the at least one wash water treatment plant.

14. The system as claimed in claim 12, wherein the controller comprises a logic circuit or processor configured and programmed to automatically control the logistics of operation of the at least one mobile earth moving equipment, at least one mobile tumbler reactor, at least one liquid-solid separator and at least one wash water treatment plant.

15. The system as claimed in claim 13, wherein the controller is manually controlled or partly manually controlled and partly automatically controlled.

16. The system as claimed in claim 12, wherein the at least one liquid-solid separator is mobile or stationary.

* * * * *